United States Patent
Iwazumi

(10) Patent No.: US 9,631,120 B2
(45) Date of Patent: Apr. 25, 2017

(54) ANTI-FOG ORGANOSILOXANE COATING COMPOSITIONS AND COATINGS

(75) Inventor: Masanori Iwazumi, Irvine, CA (US)

(73) Assignee: SDC TECHNOLOGIES, INC., Irvine, CA (US)

(*) Notice: Subject to any disclaimer, the term of this patent is extended or adjusted under 35 U.S.C. 154(b) by 150 days.

(21) Appl. No.: 13/211,683

(22) Filed: Aug. 17, 2011

(65) Prior Publication Data

US 2012/0045650 A1    Feb. 23, 2012

Related U.S. Application Data

(60) Provisional application No. 61/374,890, filed on Aug. 18, 2010.

(51) Int. Cl.

| | |
|---|---|
| B32B 9/00 | (2006.01) |
| C08K 5/42 | (2006.01) |
| C09D 183/06 | (2006.01) |
| C08J 7/04 | (2006.01) |
| C08G 77/14 | (2006.01) |
| C08K 5/5415 | (2006.01) |
| C08K 5/5435 | (2006.01) |
| C08K 5/092 | (2006.01) |

(52) U.S. Cl.
CPC .......... C09D 183/06 (2013.01); C08J 7/042 (2013.01); C08J 7/047 (2013.01); C08G 77/14 (2013.01); C08J 2369/00 (2013.01); C08J 2483/06 (2013.01); C08K 5/092 (2013.01); C08K 5/5415 (2013.01); C08K 5/5435 (2013.01); Y10T 428/31511 (2015.04)

(58) Field of Classification Search
None
See application file for complete search history.

(56) References Cited

U.S. PATENT DOCUMENTS

| | | | |
|---|---|---|---|
| 4,467,073 A | 8/1984 | Creasy | |
| 5,411,585 A | 5/1995 | Avery et al. | |
| 5,877,254 A | 3/1999 | La Casse et al. | |
| 6,897,281 B2 | 5/2005 | Lubnin et al. | |
| 2005/0121782 A1 | 6/2005 | Nakamura et al. | |
| 2008/0207797 A1 | 8/2008 | Takahashi et al. | |
| 2008/0311376 A1 | 12/2008 | Matsuda et al. | |
| 2009/0004098 A1 | 1/2009 | Schmidt et al. | |
| 2009/0197047 A1* | 8/2009 | Teranishi | 428/141 |
| 2010/0163234 A1 | 7/2010 | Fuller et al. | |
| 2010/0249357 A1* | 9/2010 | Popa et al. | 528/26 |

FOREIGN PATENT DOCUMENTS

| | | |
|---|---|---|
| CN | 1265408 A | 9/2000 |
| DE | 10330744 | 2/2005 |
| JP | 08-176466 H | 7/1996 |
| JP | H08176466 A | 7/1996 |
| JP | 3390891 | 3/2003 |
| WO | 2009085680 | 7/2009 |

OTHER PUBLICATIONS

English Machine Translation of JP08176466 (1996).*
Hydrolysis—Hawley's Condensed Chemical Dictionary—Wiley Online (2007).*
Surface Modification of Ordered Mesoporous Silica with an Organosilane Containing Peo Groups to Retain the Hydrophilic Nature the POA_Tatsuo Kimura_Chemistry Letters vol. 32, No. 2 pp. 188-189 (2003).*
The International Search Report and Written Opinion for WO Application No. PCT/US2011/048067, dated Jan. 5, 2012.
Office Action and Search Report for related Taiwan Patent Application No. 100129620, dated Sep. 16, 2013.
Office Action for related Korean Patent Application No. 10-2012-7031334, dated Feb. 27, 2014.
Office Action for related Chinese Patent Application No. 201180037758.7, dated May 15, 2014.
John A. Howarter, Jeffrey P. Youngblood, "Self Cleaning and Next Generation Anti-Fog Surfaces and Coatings" dated 2008.
Xuefeng Gao et al. "The Dry-Style Antifogging Properties of Mosquito Compound Eyes and Artificial Analogues Prepared by Soft Lithography" dated 2007.
Translation of Notice of Grant in corresponding Chinese application 201180037758.7(dated Oct. 13, 2015).
Supplementary European Search Report in corresponding European Application EP 11 81 8717 (dated Nov. 23, 2015).
Intention to Grant in corresponding European application EP 11 818 717.8 (dated Oct. 18, 2016).
Notice of Allowance and translation in corresponding Korean application 10-2012-7031334 (dated Mar. 25, 2015).
Second Office Action for related Chinese Patent Application No. 201180037758.7, dated Mar. 31, 2015.

* cited by examiner

Primary Examiner — Kenneth Stachel
(74) Attorney, Agent, or Firm — Calfee, Halter & Griswold LLP

(57) ABSTRACT

Stable organosiloxane coating compositions that provide transparent, abrasion-resistant, chemical-resistant, low-tack, and water-washable anti-fog coatings when cured, are described herein. The coating compositions comprise an epoxy functional alkoxysilane, a tetrafunctional alkoxysilane, an alkoxysilyl functional polymer having polyethylene oxide segments, an alkoxysilyl functional cationic surfactant, and a carboxylic acid functional compound. Articles coated with the coating compositions, processes for coating substrates with the anti-fog coating compositions, and processes for making the coating compositions are also described herein.

18 Claims, No Drawings

ANTI-FOG ORGANOSILOXANE COATING COMPOSITIONS AND COATINGS

CROSS-REFERENCE TO RELATED APPLICATION

This application claims priority to and any other benefit of U.S. Provisional Patent Application Ser. No. 61/374,890, filed on Aug. 18, 2010, and entitled "ANTI-FOG ORGANOSILOXANE COATING COMPOSITIONS AND COATINGS," the entire disclosure of which is incorporated by reference herein.

FIELD OF THE INVENTION

The present invention relates to anti-fog coating compositions. More particularly, the present invention relates to stable organosiloxane coating compositions that provide transparent, abrasion-resistant, chemical-resistant, low-tack, and water-washable anti-fog coatings when cured. The present invention also relates to processes for making the anti-fog coating compositions, processes for coating substrates with the anti-fog coating compositions, and articles coated with such anti-fog organosiloxane coating compositions.

BACKGROUND

Transparent organosiloxane coatings are applied to various transparent glass and plastic materials, such as optical lenses, goggles, face shields, face plates for helmets, automotive parts, etc., because of favorable properties of the coatings. One such favorable property is abrasion resistance. For transparent materials that are often soft and tend to scratch or marr quite easily, a "hard" abrasion-resistant organosiloxane coating can be applied as a protective coat over the material to prevent scratching or marring.

Organosiloxane coating compositions exhibit better stability than various other types of abrasion-resistant coating compositions, such as reactive two-component polyurethane coating systems. Reactive two-component systems need to be applied to a substrate, such as a transparent glass or plastic material, soon after mixing because the mixing initiates an irreversible reaction of the components of the coating composition, which can render the composition unsuitable for use if the composition is not used quickly enough after the initiation of the reaction. In contrast, an organosiloxane coating composition can be stored for an extended period of time after it has been prepared, i.e., weeks or months, before it is applied to the substrate.

In addition, unlike softer, more elastomeric, and less abrasion-resistant coatings, such as certain polyurethane coatings, which can have a tacky feel to the touch, the more abrasion-resistant hard organosiloxane coatings have a smooth or low-tack feel. The smooth or low-tack feel of the cured organosiloxane hard coatings enhance the cleaning properties of the coating by allowing easier wipability than the tackier soft coat coatings.

Although not an inherent property of organosiloxane coatings or a property that is easily incorporated into abrasion-resistant organosiloxane coatings, anti-fog (also referred to as anti-frost) is an additional property that is desirable for abrasion-resistant organosiloxane coatings. Fog appears when moisture condenses on a surface of the coating and is drawn into tiny droplets that scatter light. The scattering of the light gives the surface the appearance of a fog. One way a coating works to prevent fogging is to absorb the condensed moisture into the surface preventing the tiny light scattering droplets from forming. However, at some point this type of coating surface may reach saturation, thus resulting in the formation of light scattering water droplets on the surface and also resulting in poor anti-fog properties. Another way to prevent fogging is to modify the coating in a manner so as to cause the water droplets to spread or sheet across the surface, which is an effect called wetting, thereby minimizing the light scattering effect of the water droplets.

This water spreading or sheeting property can be incorporated into the coating using surface active agents, which are also known as surfactants, to improve water wetting on the surface of the coating. Surfactants generally contain both hydrophilic and hydrophobic segments and are used to impart the properties of these segments on the surfaces of the coating, including surfaces of organosiloxane polymer coatings. These surfactants can be applied externally by wiping or spraying the surfactant on the surface to form a temporary anti-fog film. Alternatively, the surfactants can be mixed in with the coating composition as an additive before it is applied to a surface, so that the surfactant becomes mixed within the physical structure of the coating, i.e., polymer structure, as the coating composition cures. Such surfactants that are only externally applied or mixed in with the coating easily wash off or leach away from the cured coating when exposed to water washing or water soaking, thereby resulting in the dissipation of the anti-fog properties for the coating surface.

Described herein are stable organosiloxane coating compositions which provide transparent, abrasion-resistant, chemical-resistant, low-tack, and water-washable anti-fog coatings when cured. The coating compositions described herein include surfactants that are resilient to water washing or water soaking.

SUMMARY

In accordance with the embodiments of this invention, stable organosiloxane coating compositions, which provide transparent, abrasion-resistant, chemical-resistant, low-tack, and water-washable anti-fog coatings when cured, are described herein. In accordance with other embodiments, articles coated with the coating compositions of this invention are provided. Other embodiments in accordance with the present invention include processes for preparing the anti-fog coating compositions and processes for coating a substrate with the anti-fog coating compositions.

In accordance with one embodiment, a stable, anti-fog coating composition comprises an aqueous-organic solvent mixture including a non-reactive anionic surfactant, a carboxylic acid functional compound, and a mixture of hydrolysis products and partial condensates. The mixture of hydrolysis products and partial condensates comprises an epoxy functional alkoxysilane, a tetrafunctional alkoxysilane, an alkoxysilyl functional polymer having polyethylene oxide segments, and an alkoxysilyl functional cationic surfactant.

In accordance with another embodiment, the coating composition further comprises a blocked isocyanate.

In accordance with other embodiments, the aqueous-organic solvent mixture further comprises at least one of a colloidal silica or the hydrolysis products and partial condensates of a compound selected from the group consisting of an alkoxysilyl functional salt of an anionic surfactant, a methyltrialkoxysilane, a bis-trialkoxysilyl functional ethane, and combinations thereof.

In accordance with other embodiments, an article comprises a transparent substrate coated with the stable, anti-fog coating composition. The article further comprises a primer layer disposed between the transparent substrate and the coating composition.

In accordance with another embodiment of the present invention, a process for preparing the stable, anti-fog coating composition comprises reacting an epoxy functional alkoxysilane, a tetrafunctional alkoxysilane, an alkoxysilyl functional polymer having polyethylene oxide segments, an alkoxysilyl functional cationic surfactant, and a carboxylic acid functional compound in an aqueous-organic solvent to form a mixture comprising hydrolysis products and partial condensates, and mixing a non-reactive anionic surfactant with the mixture comprising the hydrolysis products and partial condensates.

In accordance with other embodiments, the process for preparing the coating composition further comprises mixing a blocked isocyanate with the coating composition. Moreover, the step of reacting further comprises the presence of a compound selected from the group consisting of an alkoxysilyl functional salt of an anionic surfactant, a methyltrialkoxysilane, a bis-trialkoxysilyl functional ethane, a colloidal silica, and combinations thereof. Also, the process for preparing the coating composition may further comprise preparing the alkoxysilyl functional polymer having polyethylene oxide segments by reacting a polyol polymer having polyethylene oxide segments with an isocyanato-alkyl functional alkoxysilane. In addition, the process may further comprise preparing the alkoxysilyl functional cationic surfactant by reacting an isocyanato-alkyl functional alkoxysilane and a quaternary ammonium surfactant having two hydrophilic isocyanate-reactive functional groups and a hydrophobic hydrocarbon chain having at least about 18 carbon atoms.

In accordance with other embodiments of the invention described herein, a process for coating a substrate with the stable, anti-fog coating composition comprises applying the coating composition to at least one surface of a transparent substrate and curing the coating composition on the at least one surface of the substrate. The process may also further comprise applying the coating composition directly to the at least one surface of the substrate. Alternatively, the process may further comprise applying a primer to the at least one surface of the substrate and air-drying or at least partially curing the primer prior to applying the coating composition to the primer.

DETAILED DESCRIPTION

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. The present invention may be embodied in different forms, and the reference to the specific embodiments of this application should not be construed to limit the invention to the embodiments described herein. Rather, these embodiments are provided for thoroughness and completeness of this disclosure.

As used in the description of the invention and the appended claims, the singular forms "a," "an," and "the" are intended to include the plural forms as well, unless the context clearly indicates otherwise.

Unless otherwise indicated (e.g., by use of the term "precisely"), all numbers expressing quantities, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention.

The organosiloxane coating compositions described herein are stable and provide transparent, abrasion-resistant, chemical-resistant, low-tack, and water-washable anti-fog coatings when cured. The coating compositions are stable because they are able to be prepared and stored for a period of time, e.g., weeks or months, before the coating composition is applied to the substrate or otherwise begins curing. Although the coating compositions described herein exhibit such stability, the coating compositions do not require aging or storage before curing to form the coating.

The transparency of the anti-fog coatings formed from the coating compositions of this invention is illustrated herein by the measurement of the percent haze of the coating on the substrate, which is a quantification of the amount of light scattered as a result of the transmission of the light through the coated substrate. The instruments used for the measurements described herein are described in greater detail below. Haze greater than or equal to about 1.0% is visible on the surface of the coating. The anti-fog coatings formed from the coating compositions described herein have a haze less than or equal to about 1.0%.

The anti-fog properties are illustrated by various anti-fog test techniques. One technique is to subject a coated substrate to the "beaker test." As used herein, the "beaker test" refers to a test wherein the coated substrate is positioned at a standard height above a beaker containing 50° C. water, and the coated substrate in this position is exposed water vapors from the 50° C. water for a period of time. If no fog appears on the coated substrate during this period of time, this shows that the coating is resistant to fogging. Otherwise, if fog does eventually appear on the coated substrate, the time it takes for the fog to appear provides a quantitative measurement of the resistance of the coating to fogging.

To show the resiliency of the anti-fog properties of the coating compositions, such as to show the water-washability of the coatings, the beaker test is used before and after the coating has been treated or subjected to other tests. For example, the beaker test is used to show the fog resistance of the coated substrate prior to any other treatment of the coated substrate, which is referred to below as the "initial anti-fog test." The anti-fog coatings formed from the coating compositions of the present invention remain clear during the initial anti-fog test.

The beaker test is also used to show the resistance to fog after soaking the coated substrate in room temperature water for one hour followed by a 12 hour drying and recovery period, referred to herein as the "room temperature water soak anti-fog test." This room temperature water soak anti-fog test method is based on EN166/EN168 anti-fog test methodology, which uses the beaker test to determine how long the coated substrate remains clear while being exposed to water vapors after the coated substrate has been soaked for one hour in room temperature water and dried for a 12 hour period. The anti-fog coatings formed from the coating compositions of the present invention remain clear for at least about six seconds up to about three minutes. Generally, for the coatings formed from the coating compositions of the present invention, it takes less than three minutes after first exposing the coated substrate to the water vapor for a continuous film of water to form over the entire coating from the prolonged exposure to the water vapor during the beaker test. After this continuous film of water forms over the coating, the coating will not fog-up because the water will sheet out across the film of water, thereby not allowing the tiny water droplets that give the appearance of fog to form. The ability of the coatings formed from the coating compositions of this invention to retain anti-fog properties after a room temperature water soak demonstrates that the coatings are able to withstand—or at least are resilient—to significant or prolonged exposure to water, and as such are referred to herein as "water-washable" coatings.

Moreover, the beaker test is also used herein to show the anti-fog properties of the coatings that are subjected to more rigorous water treatment than the room temperature water soak anti-fog test. The more rigorous water treatment includes soaking the coated substrate in boiling water for one hour, followed by a cooling and drying period. The anti-fog properties of this cooled and dried coated substrate are then tested with the beaker test. This anti-fog test is referred to herein as the "boiling water soak anti-fog test." The anti-fog coatings formed from certain embodiments of the coating compositions described herein remain clear for at least five seconds up to about three minutes, which, as described above, is generally after the point in time where a continuous film of water forms from exposure to the water vapors during the beaker test over the entire coating, thus preventing fogging on the coated substrate. The ability to retain anti-fog properties after soaking in boiling water for an hour demonstrates an enhancement to the water-washability for the coatings formed from the certain embodiments of the coating compositions of this invention.

A more qualitative test to illustrate the anti-fog properties of coatings formed from the compositions described herein is a "breath test." The coated substrate is positioned about one to three inches from the tester's mouth. The tester intentionally breathes on the coated substrate in a manner so as to attempt to fog-up the substrate. Coatings formed from the coating compositions described herein remain clear during the breath test and do not fog-up.

The abrasion resistance of the anti-fog coatings formed from the coating compositions described herein is demonstrated by measuring the haze gain, which is the mathematical difference in the percent haze of the substrate coated with the anti-fog coating, before and after subjecting the coated substrate to abrasion caused by falling sand, as described in greater detail below. The haze gain measured for coatings formed from the anti-fog coating compositions described herein range from about 3.0% to about 15.0%.

The anti-fog organosiloxane hard coatings formed from the coating compositions of this invention are also resistant to exposure from chemicals, which when contacted with the coating, can act to attack the coating. This resistance to chemicals is demonstrated by separately wiping the cured coating with each of methyl ethyl ketone and isopropyl alcohol, in addition to separately placing drops of methyl ethyl ketone and toluene on the cured coating. The coatings formed from the coating compositions of this invention resist attack from these chemicals when these chemicals are wiped or placed as drops on the coating.

The low-tack properties of the anti-fog coatings formed from the coating compositions described herein is demonstrated by wiping the coating with a cotton tissue. As used herein, "low-tack" refers to the smoothness or clean-feel of the coating as compared to a coating with a tacky feel to the touch. By wiping the coating with a tissue, coatings with a smooth, low-tack surface will accumulate less tissue residue than coatings with a rougher or higher tack surface. The coatings formed from the coating compositions described herein are considered to have smooth, low-tack surfaces in accordance with this test.

The properties described above are drawn from the coating compositions of the present invention. In accordance with one embodiment, a stable organosiloxane coating composition, which provides a transparent, abrasion-resistant, chemical-resistant, low-tack, and water-washable anti-fog coating when cured, comprises an aqueous-organic solvent mixture comprising a non-reactive anionic surfactant, a carboxylic acid functional compound, and a mixture of hydrolysis products and partial condensates of an epoxy functional alkoxysilane, a tetrafunctional alkoxysilane, an alkoxysilyl functional polymer having polyethylene oxide segments, and an alkoxysilyl functional cationic surfactant.

Under the appropriate conditions, a hydrolysis reaction occurs resulting in partially or fully hydrolyzed species of alkoxysilanes and alkoxysilyl functional compounds when the alkoxysilanes and alkoxysilyl compounds are combined with an aqueous-organic solvent. At least some of the resultant fully or partially hydrolyzed alkoxysilanes and alkoxysilyl compounds combine in partial condensation reactions to than a coating composition of organosiloxane oligomers. The reactions forming the organosiloxane oligomers are controlled by controlling the temperature, pH, solvent and water content, solvent type, use of catalysts, and the like. When cured, the coating composition of this invention forms an anti-fog organosiloxane polymer coating that is resilient against water washing or water soaking, i.e., water-washable.

In accordance with the present embodiment, suitable epoxy functional silanes used in the anti-fog coating compositions described herein are represented by the formula $R^1_xSi(OR^2)_{4-x}$, where x is an integer of 1, 2, or 3; where $R^1$ is selected from the group consisting of H, an alkyl group, a functionalized alkyl group, an alkylene group, an aryl group, an alkyl ether group, wherein $R^1$ contains from 1 to about 10 carbon atoms when $R^1$ is not H, and wherein $R^1$ has at least 1 epoxy functional group; where $R^2$ is selected from the group consisting of H, an alkyl group containing from 1 to about 5 carbon atoms, an acetyl group, and a $-Si(OR^3)_{3-y}R^4_y$ group, where y is an integer of 0, 1, 2, or 3; where $R^3$ is selected from the group consisting of H, an alkyl group containing from 1 to about 5 carbon atoms, an acetyl group, and a $-Si(OR^3)_{3-y}R^4_y$ group; and where $R^4$ is selected from the group consisting of H, an alkyl group, a functionalized alkyl group, an alkylene group, an aryl group, and an alkyl ether group, wherein $R^4$ contains from 1 to about 10 carbon atoms when $R^4$ is not H.

Examples of suitable epoxy functional alkoxysilanes include, but are not limited to, glycidoxymethyltrimethoxysilane, 3-glycidoxypropyltrihydroxysilane, 3-glycidoxypropyl dimethylhydroxysilane, 3-glycidoxypropyltrimethoxysilane, 3-glycidoxypropyltriethoxysilane, 3-glycidoxypropyldimethoxymethylsilane, 3-glycidoxypropyldimethylmethoxysilane, 3-glycidoxypropyltributoxysilane, 1,3-bis(glycidoxypropyl)tetramethyldisiloxane, 1,3-bis(glycidoxypropyl)tetramethoxydisiloxane, 1,3-bis(glycidoxypropyl)-1,3-dimethyl-1,3-dimethoxydisiloxane, 2,3-epoxypropyltrimethoxysilane, 3,4-epoxybutyltrimethoxysilane, 6,7-epoxyheptyltrimethoxysilane, 9,10-epoxydecyltrimethoxysilane, 1,3-bis(2,3-epoxypropyl)tetramethoxydisiloxane, 1,3-bis(6,7-epoxy-heptyl)tetramethoxydisiloxane, 2-(3,4-epoxycyclohexyl)

ethyltrimethoxysilane, and the like. The 3-glycidoxypropyltrimethoxysilane is the preferred epoxy functional silane used with the coating compositions herein.

The tetrafunctional alkoxysilanes used in accordance with this embodiment of the anti-fog coating compositions described herein are represented by the formula $Si(OR^5)_4$, where $R^5$ is selected from the group consisting of H, an alkyl group containing from 1 to about 5 carbon atoms, an alkyl ether group containing from 1 to about 5 carbon atoms, a —$Si(OR^6)_3$ group; and where $R^6$ is selected from the group consisting of H, an alkyl group containing from 1 to about 5 carbon atoms, an alkyl ether group containing from 1 to about 5 carbon atoms, and a —$Si(OR^6)_3$ group.

Examples of suitable tetrafunctional alkoxysilanes for use in the anti-fog coating compositions described herein based on the formula $Si(OR^5)_4$ include, but are not limited to, tetramethyl orthosilicate, tetraethyl orthosilicate, tetrapropyl orthosilicate, tetraisopropyl orthosilicate, tetrabutyl orthosilicate, tetraisobutyl orthosilicate, tetrakis(methoxyethoxy)silane, tetrakis(methoxypropoxy)silane, tetrakis(ethoxyethoxy)silane, tetrakis(methoxyethoxyethoxy)silane, trimethoxyethoxysilane, dimethoxydiethoxysilane, triethoxymethoxysilane, poly(dimethoxysiloxane), poly(diethoxysiloxane), poly(dimethoxy-diethoxysiloxane), tetrakis(trimethoxysiloxy)silane, tetrakis(triethoxysiloxy)silane, and the like. The preferred tetrafunctional alkoxysilanes used with the anti-fog coating compositions of this invention include tetraethyl orthosilicate.

The anti-fog coating compositions in accordance with the present embodiment include an alkoxysilyl functional polymer having polyethylene oxide segments. Polyethylene oxide is hydrophilic and can be added to polymeric coating compositions as a way to improve the anti-fog properties of the coating formed form such compounds by modifying the hydrophilicity of the coating. Therefore, the hydrophilic polyethylene oxide segments of the alkoxyfunctional compound are incorporated into the organosiloxane polymer upon the hydrolysis and condensation reactions of this anti-fog coating composition, and the incorporation of these hydrophilic segments improve the resistance to fog in the cured organosiloxane polymer coating.

The alkoxysilyl functional polymers having polyethylene oxide segments used with the anti-fog coating compositions described herein have at least one alkoxysilyl functional group. Examples of suitable alkoxysilyl functional polymers having polyethylene oxide segments are bis(3-trialkoxysilylpropyl)polyethylene oxides, such as bis(3-triethoxysilylpropyl)polyethylene oxides and bis(3-trimethoxysilylpropyl)polyethylene oxides, and [hydroxy(polyethyleneoxy)propyl]trialkoxysilanes, such as [hydroxy(polyethyleneoxy)propyl]triethoxysilanes and [hydroxy(polyethyleneoxy)propyl]-trimethoxysilanes.

Other examples of suitable alkoxysilyl functional polymers having polyethylene oxide segments include the reaction products of an isocyanato-alkyl functional alkoxysilane and a polyol polymer having polyethylene oxide segments. Such polyol polymers include a diol polymer having polyethylene oxide segments, a triol polymer having polyethylene oxide segments, and combinations thereof. Further examples of the polyol polymers include an alkoxylated polyether polyols having polyethylene oxide segments or combinations of polyethylene oxide segments and polypropylene oxide segments. More specifically, examples of suitable polyol polymers include polyethylene glycol, polyethylene oxide and polypropylene oxide copolymer diols or triols, trimethylol propane monoethoxylate methyl ether, and polyethylene oxide and polypropylene oxide block copolymer diols. Preferably polyethylene glycols or polyethylene oxide and polypropylene oxide copolymer triols are used herein as the polyol polymer to form the alkoxysilyl functional polymers having polyethylene oxide segments.

Examples of suitable isocyanto-alkyl functional alkoxysilanes used to form the alkoxysilyl functional polymers having polyethylene oxide segments are represented by the formula of $R^7Si(OR^8)_3$, where $R^7$ is selected from the group consisting of an isocyanate functional alkyl group containing from 1 to about 6 carbon atoms and an isocyanate functional alkyl ether group containing from 1 to about 6 carbon atoms; and where $R^8$ is selected from the group consisting of an alkyl group containing from 1 to about 3 carbon atoms, an alkyl ether group containing from 1 to about 3 carbon atoms, and an —$Si(OR^8)_3$ group. Examples of a suitable isocyanto-alkyl functional alkoxysilane includes 3-isocyantopropyl triethoxysilane, 3-isocyanatopropyl trimethoxysilane, 2-isocyanatoethyl trimethoxysilane, 2-isocyanatoethyl triethoxysilane, 3-isocyanatopropyl methyldimethoxysilane, 2-isocyanatoethyl methyldimethoxysilane, 3-isocyanatopropyl methyldiethoxysilane, 2-isocyanatoethyl methyldiethoxysilane, 4-isocyanatobutyl trimethoxysilane, 4-isocyanatobutyl triethoxysilane, 5-isocyanatopentyl trimethoxysilane, 5-isocyanatopentyl triethoxysilane, 6-isocyanatohexyl trimethoxysilane, 6-isocyanatohexyl triethoxysilane, and the like, preferably 3-isocyantopropyl triethoxysilane.

The reaction products of the isocyanato-alkyl functional alkoxysilane and a polyol polymer having polyethylene oxide segments include compounds having unreacted hydroxyl functional groups as well compounds having fully reacted hydroxyl functional groups. The reaction product compounds having unreacted hydroxyl functional groups are provided by reacting the isocyanto-alkyl functional alkoxysilanes and polyols such that there is an excess of hydroxyl functional groups of the polyol over the isocyanate-alkyl functional groups of the isocyanato-alkyl functional alkoxysilanes. Accordingly, the reaction products are formed in the presence of a molar ratio of isocyanto-alkyl functional groups of the isocyanato-alkyl functional alkoxysilane to hydroxyl functional groups of the polyol polymer ranging from about 1:3 to about 1:1.

The anti-fog coating compositions of the present embodiment include an alkoxysilyl functional cationic surfactant, which also contributes to the anti-fog properties of the coating compositions described herein. Examples of suitable alkoxysilyl functional cationic surfactants include alkoxysilyl functional ammonium salts, such as N-trialkoxysilylalkyl-N,N,N-trialkylammonium chlorides, N-trialkoxysilylalkyl-N,N,N-trialkylammonium bromides, and N-trialkoxysilylalkyl-N,N,N-trialkylammonium acetates. A specific, non-limiting, example of such ammonium salt includes a N-trimethoxysilylpropyl-N,N,N-tri-n-butylanmionium bromide in a 50% methanol solution.

Other examples of suitable alkoxysilyl cationic surfactants include the reaction products of an isocyanato-alkyl functional alkoxysilane as described herein and a quaternary ammonium, phosphonium, or sulfonium surfactant having two hydrophilic isocyanate-reactive functional groups and a long hydrocarbon chain hydrophobic tail. As referred to herein, an "isocyanate-reactive functional group" is a functional group having an active hydrogen that readily reacts with an isocyanate functional group, such as a hydroxyl functional group, a carboxyl functional group, or an amine functional group. Each of the two isocyanate-reactive hydrophilic functional groups present on this surfactant comprise hydroxyl-terminated alkoxylated chains, preferably hydroxyethyl functional group chains, which contributes to the hydrophilic character of this surfactant. The long chain hydrophobic hydrocarbon tail generally has at least 16 carbon atoms and includes amido functional groups. Preferably, the long chain hydrophobic tail has at least about 18 carbon atoms and includes a stearamide or a stearamidopropyl functional group. Specific examples of such quaternary cationic surfactants include bis(polyhydroxyethyl) quaternary ammonium surfactants having stearamide or stearamidopropyl functional groups or N,N-bis(2-hydroxyethyl)-n-(3-dodecyloxy-2-hydroxypropyl) methylammonium sulfate.

In accordance with this embodiment, the preferred alkoxysilyl functional cationic surfactant comprises the reaction products of an isocyanato-alkyl functional alkoxysilane as described herein and a quaternary ammonium surfactant having two hydrophilic isocyanate-reactive functional groups and a hydrophobic hydrocarbon chain having at least about 18 carbon atoms as described herein, in which the two hydrophilic isocyanate-reactive functional groups comprise hydroxyethyl functional groups and the hydrophobic hydrocarbon chain comprises a stearamide or a stearamidopropyl functional group.

The coating compositions described herein comprise an alkoxysilyl functional cationic surfactant in an amount ranging from greater than 0 to about 50% by weight solids, preferably an amount ranging from about 1% to about 20% by weight solids.

In accordance with the present embodiment, the anti-fog coating compositions comprise a non-reactive anionic surfactant. This non-reactive surfactant is added to the coating composition during or after the hydrolysis and condensation reactions forming the organosiloxanes oligomers. However, the non-reactive anionic surfactant does not covalently bond to the organosiloxane oligomers of the coating composition and the organosiloxane polymers of the cured coating. Instead, this surfactant physically associates with the polymeric structure of the coating. Examples of a suitable non-reactive anionic surfactant are sodium dioctyl sulfosuccinate, sodium bistridecyl sulfosuccinate, sodium dihexyl sulfosuccinate, sodium dicyclohexyl sulfosuccinate, sodium diamyl sulfosuccinate, sodium diisobutyl sulfosuccinate, and alkylamine-guanidine polyoxyethanol. Any of the foregoing examples of non-reactive anionic surfactants are also used with the anti-fog coating compositions diluted in a suitable solvent. The preferred non-reactive anionic surfactant used with the coating compositions described herein is sodium dioctyl sulfosuccinate.

The coating compositions described herein comprise a non-reactive anionic surfactant in an amount ranging from greater than 0 to about 20% by weight solids, preferably an amount ranging from about 1% to about 10% by weight solids.

Each of the alkoxysilyl functional cationic surfactant, the alkoxysilyl functional polymer having polyethylene oxide segments, and the non-reactive anionic surfactant modify the hydrophilic and hydrophobic properties of the coating to improve the wetting, and consequently, to improve the anti-fog coating properties of the coating's surface. Unlike the alkoxysilyl functional cationic surfactant and the alkoxysilyl functional polymer having polyethylene oxide segments which, as part of the mixture of hydrolysis products and partial condensates are chemically incorporated into the structure of the organosiloxane polymer as discussed above, the non-reactive anionic surfactant does not chemically react with the organosiloxane polymer. However, the non-reactive anionic surfactant described herein does not wash out or leach away after washing or soaking the cured coating in water. Without intending to be limited to any theories, it is believed by the inventor that this non-reactive anionic surfactant does not wash out or leach away because the non-reactive anionic surfactant develops an ionic relationship with the alkoxysilyl functional cationic surfactant, and this ionic relationship helps retain the non-reactive surfactant within the polymeric structure of the cured organosiloxane coating even after repeated or lengthy exposure to water by water soaking or washing.

Also in accordance with the present embodiment, the coating compositions described herein comprise a carboxylic acid functional compound. Examples of the carboxylic acid functional compound are represented by the formula $R^9(COOR^{10})_x$, where x is an integer of 1, 2, 3, or 4; and where $R^9$ is selected from the group consisting of H, an alkyl group, a functionalized alkyl group, an alkylene group, an aryl group, a functionalized aryl group, and an alkyl ether group, wherein $R^9$ contains from 1 to about 10 carbon atoms when $R^9$ is not H and when $R^9$ is not a functionalized aryl group; and where $R^{10}$ is selected from the group consisting of H, a formyl group, a carbonyl group, and an acyl group, wherein the acyl group can be functionalized with an alkyl group, a functionalized alkyl group, an alkylene group, an aryl group, a functionalized aryl group, and an alkyl ether group, and further wherein each of the alkyl group, the functionalized alkyl group, the alkylene group, the aryl group, the functionalized aryl group, and the alkyl ether group each contain from 1 to about 10 carbon atoms.

Specific examples of carboxylic acid functional compounds suitable for use with the anti-fog coating compositions include multifunctional carboxylic acids, such as malic acid; aconitic acid (cis,trans); itaconic acid; succinic acid; malonic acid; glutaric acid; adipic acid; pimelic acid; suberic acid; azelaic acid; sebacic acid; cyclohexyl succinic acid; 1,3,5 benzene tricarboxylic acid; 1,2,4,5 benzene tetracarboxylic acid; 1,4-cyclohexanedicarboxylic acid; 1,3-cyclohexanedicarboxylic acid; 1,1-cyclohexanediacetic acid; 1,3-cyclohexanedicarboxylic acid; 1,1-cyclohexanediacetic acid; 1,3-cycloheanediacetic acid; 1,3,5-cyclohexanetricarboxylic acid; unsaturated dibasic acids, such as fumaric acid and maleic acid; and combinations thereof.

Other specific examples of the carboxylic acid functional compounds suitable for use with the anti-fog coating compositions include monofunctional carboxylic acids such as acetic acid, acrylic acid, methacrylic acid, formic acid, propionic acid, butanoic acid, and combinations thereof.

The carboxylic acid functional compound used with the anti-fog coating compositions of the present invention also include anhydrides of the above-mentioned carboxylic acids. For example, the following anhydrides are suitable for the anti-fog coating compositions: acetic anhydride; propionic anhydride; acrylic anhydride; methacrylic anhydride; the cyclic anhydrides of the above mentioned dibasic acids, such as succinic anhydride, itaconic anhydride, glutaric anhydride, trimellitic anhydride, pyromellitic anhydride, phthalic anhydride, maleic anhydride; and combinations thereof.

Other carboxylic acid functional compounds suitable for use with the anti-fog coating compositions described herein include alkoxysilanes of multifunctional carboxylic acids, alkoxysilanes of monofunctional carboxylic acids, and alkoxysilanes of the above-described anhydrides, such as a 3-(triethoxysilyl)propylsuccinicanhydride.

Carboxylic acid functional compounds that are used with the coating compositions described herein also include combinations of any of the foregoing described carboxylic acid functional compounds. Preferred carboxylic acid functional compounds used with the coating compositions described herein are multifunctional carboxylic acids, and more specifically, the preferred carboxylic acid functional compound is itaconic acid.

In accordance with other embodiments of the present coating composition, methyltrialkoxysilanes are used in the place of the tetrafunctional alkoxysilanes or are optionally incorporated into the coating compositions of the present invention in addition to the tetrafunctional alkoxysilanes. The tetrafunctional alkoxysilanes are preferred over methyltrialkoxysilanes because the methyl functional group of the methyltrialkoxysilanes renders the compound comparatively less hydrophilic than the tetrafunctional alkoxysilanes. Suitable methyltrialkoxysilanes are represented by the formula $CH_3Si(OR^{11})_3$, where $R^{11}$ is an alkyl group containing from 1 to about 10 carbon atoms. Examples of such methyltrialkoxysilanes represented by the above-defined formula are methyltrimethoxysilane, methyltriethoxysilane, methyltripropoxysilane, methyltributoxysilane, methyltripentoxysilane, methyltrihexoxysilane, methyltriheptoxysilane, methyltrioctoxysilane, methyltrinonoxysilane, and methyltridecoxysilane, preferably methyltrimethoxysilane.

In accordance with other embodiments of the coating compositions of the present invention, bis-trialkoxysilyl functional ethanes represented by the formula $(R^{12}O)_3SiCH_2CH_2Si(OR^{12})_3$, where $R^{12}$ is an alkyl group containing from 1 to about 2 carbon atoms, are used in the place of the tetrafunctional alkoxysilanes in the coating compositions of this invention or are optionally incorporated into the coating compositions in addition to the tetrafunctional alkoxysilanes. Examples of suitable bis-trialkoxysilyl functional ethanes used in accordance with this embodiment include 1,2-bis(trimethoxysilyl)ethane and 1,2-bis(triethoxysilyl)ethane.

In accordance with another embodiment, to improve the anti-fog properties of the coating, an alkoxysilyl functional salt of an anionic surfactant is optionally added to the coating composition. The addition of the alkoxysilyl functional salt of an anionic surfactant improves the resistance of this coating to fogging by improving the resiliency of the anti-fog properties to rigorous water treatments. In accordance with this embodiment, a coating composition including this alkoxysilyl functional salt of an anionic surfactant remains clear throughout the duration of the exposure of the water vapors of the boiling water soak test. See, for example, the comparable coating compositions of Example 4 and Example 5A, where the primary difference between the coatings is that the composition of Example 5A does not include the alkoxysilyl functional salt of an anionic surfactant.

The alkoxysilyl functional salt of an anionic surfactant of this embodiment reacts during hydrolysis and condensation reactions to form a pendant, i.e., side-chain, surfactant on the organosiloxane oligomer of the coating compositions. The alkoxysilyl functional salt of an anionic surfactant used herein comprises the reaction products of an isocyanto-alkyl functional alkoxysilane described above and an isocyanate-reactive functional salt of an anionic surfactant. The isocyanate-reactive functional salt of an anionic surfactant contemplated herein is the product of a neutralization reaction between an acid of an anionic surfactant and a base containing one isocyanate-reactive functional group, such as a hydroxyl functional group, so as to incorporate the isocyanate-reactive functionality of the hydroxyl functional group into the salt resulting from the neutralization reaction. Suitable isocyanate-reactive anionic salts of surfactants in accordance with this embodiment include active hydrogen amine salts of alkyl sulfonic acids, active hydrogen amine salts of alkybenzene sulfonic acids, amino-alcohol sulfonates, particularly sulfonates having an alkyl chain with at least about 16 carbon atoms in the chain. The foregoing suitable isocyanate-reactive anionic salts of surfactants are also used in solution with an organic solvent to form the coating compositions of the present invention. A specific example of a preferred salt includes a salt of dodecylbenzene sulfonic acid and 2-dimethylamine-2-methylpropan-1-ol in a 50% xylene solution.

In accordance with another embodiment, the coating compositions described herein optionally comprise a metal oxide sol. The metal oxide sol is an aqueous or organic solvent colloid with metal oxide particulate matter forming the solid phase of the sol. Examples of metal oxide particulate matter include titania, zirconia, tin oxide, antimony oxide, iron oxide, lead oxide, bismuth oxide, silica, and alumina, preferably silica. The preferred metal oxide sol for use with the coating compositions described herein includes colloidal silica.

Because the surface of the colloidal silica includes surface bound hydroxyls, colloidal silica is considered a reactive material that can react with other materials that are reactive with hydroxyl functional groups. Therefore, as contemplated herein, the colloidal silica is added as a reactive material to the coating compositions in accordance with this embodiment of the present invention. The colloidal silica is beneficial to the coating composition because it improves the abrasion resistance of the coating and also reduces shrinking upon curing, which can cause cracking or adhesion failure in the cured coating.

In accordance with another embodiment, the anti-fog coating compositions described herein comprise an aqueous-organic solvent mixture comprising a non-reactive anionic surfactant; a carboxylic acid functional compound; a mixture of hydrolysis products and partial condensates of an epoxy functional alkoxysilane, a tetrafunctional alkoxysilane, an alkoxysilyl functional polymer having polyethylene oxide segments, an alkoxysilyl functional cationic surfactant; and at least one of a colloidal silica or the hydrolysis products and partial condensates of a compound selected from the group consisting of an alkoxysilyl functional salt of an anionic surfactant, a methyltrialkoxysilane, a bis-trialkoxysilyl functional ethane, and combinations thereof.

In accordance with another embodiment, the coating compositions described herein optionally comprise a blocked isocyanate. The blocked isocyanates are added to the coating composition following the hydrolysis and condensation reactions of the alkoxysilanes and alkoxysilyl functional compounds used in the formation of the coating composition. Examples of suitable blocked isocyanates include blocked aliphatic polyisocyanates such as blocked hexamethylene diisocyanates; blocked isophorone diisocyanates; blocked cyclohexylene diisocyanates, such as 1,4-cyclohexylene diisocyanates; blocked dicyclohexylmethane diisocyanates, such as 4,4'-diisocyanato-dicyclohexylmethanes; blocked isocyanates derived from the foregoing diisocyanates, such as blocked hexamethylene diisocyanate biurets or blocked hexamethylene diisocyanate trimers; and combinations thereof. Suitable blocking agents used to block the isocyanates include active-methyl-type, lactam-type, alcohol-type, oxime-type, and phenolic-type blocking agents. Non-limiting examples of blocking agents include dimethylpyrazole (DMP), i.e., 3,5-dimethylpyrazole; methylethylcetoxime (MEKO); diethyl malonate (DEM); and the like.

Specific examples of suitable blocked isocyanates include Desmodur® BL 3175A, Desmodur® BL 3272, Desmodur® BL 3370, Trixene BI 7960, Trixene BI 7961, Trixene BI 7982, and Trixene BI 7984, which respectively are blocked isocyanates based on hexamethylene diisocyanates. Other specific examples of suitable blocked isocyanates include Desmodur® BL 4265 and Trixene BI 7950, which respectively are blocked isocyanates based on isophorone diisocyanates. A specific example of a blocked isocyanate based on a both a hexamethylene diisocyanate and an isophorone diisocyanate is Desmodur® BL 3475. The Desmodur® brand blocked isocyanates are commercially available from Bayer MaterialScience LLC of Pittsburgh, Pa. The Trixene blocked isocyanates are commercially available from Baxenden Chemicals Ltd. of the United Kingdom. The coating compositions comprise a blocked isocyanate in an amount ranging from 0 to about 10% by weight solids.

The solvent of the aqueous-organic solvent mixture of the coating compositions of the present invention comprise water and any organic solvent or combination of organic solvents that are compatible with the components of the coating composition described above. The water present in the solvent is in an amount sufficient to hydrolyze the hydrolyzable components present in the coating composition, e.g., any epoxy functional alkoxysilanes, tetrafunctional alkoxysilanes, alkoxysilyl functional polymers having polyethylene oxide segments, alkoxysilyl functional cationic surfactants, methyltrialkoxysilanes, bis-trialkoxysilyl functional ethanes, and alkoxysilyl functional salt of an anionic surfactants, that are present in the coating composition.

The organic solvent portion of the aqueous-organic solvent comprises an alcohol, an ether, a glycol, a glycol ether, a ketone, an ester, and combinations thereof. Examples of suitable alcohols are represented by the formula $R^{13}OH$, where $R^{13}$ is an alkyl group containing from 1 to about 10 carbon atoms. Suitable glycols, ethers, and glycol ethers are represented by the formula $R^{14}$—$(OR^{15})_x$—$OR^{16}$, where x is the integer of 0, 1, 2, 3 or 4; where $R^{14}$ is selected from the group consisting of H and an alkyl group containing from 1 to about 10 carbon atoms; where $R^{15}$ is an alkylene group containing from 1 to about 10 carbon atoms; and where $R^{16}$ is selected from the group consisting of H and an alkyl group containing from 1 to about 10 carbon atoms. Examples of glycols, ethers, and glycol ethers represented by the above-formula include di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol, and combinations thereof. In addition to the above, cyclic ethers such as tetrahydrofuran and dioxane are suitable ethers for the aqueous-organic solvent mixture. Preferred as the organic solvent portion of the aqueous-organic solvent described herein includes propylene glycol methyl ether.

Hydrolysis and condensation catalysts are optionally used in the preparation of the coating compositions described herein, although the use of these types of catalysts can affect the properties of the anti-fog coating composition, such as storage stability, or the properties of the anti-fog coating formed from these coatings, such as adhesion, resistance to cracking, abrasion resistance, and the like. Examples of suitable hydrolysis catalysts include mineral acids such as hydrochloric acid or nitric acid. Examples of suitable condensation catalysts include metal acetylacetonates, diamides, imidazoles, amines, ammonium salts, organic sulfonic acids and their amine salts, alkali metal salts of carboxylic acids, alkali metal hydroxides, and fluoride salts.

Catalysts are also optionally used in the preparation of the alkoxysilyl functional compounds described herein. Catalysts suitable for reactions forming urethane linkages, i.e., reactions between isocyanate functional groups and isocyanate-reactive functional groups present in the reactions forming the alkoxysilyl functional compounds, are suitable for use herein. Examples of such catalysts include metal carboxylates (i.e., metal salts of carboxylic acids), such a tin(II) ethylhexanoate, dibutyltindilaurate, and dibutylin bis (octylmaleate).

An effective amount of a leveling or flow control agent optionally is incorporated into the coating composition described herein to spread more evenly or level the composition on the surface of the substrate and to provide substantially uniform contact with the substrate. The amount of the leveling or flow control agent can vary widely but is used in an amount sufficient to provide the coating composition with about 10 ppm to about 5,000 ppm of the leveling or flow control agent. Any conventional, commercially available leveling or flow control agent which is compatible with the coating composition and the substrate, which does not negatively affect the anti-fog properties of the coating composition, which is capable of leveling the coating composition on a substrate, and which enhances wetting between the coating composition and the substrate is employed. Non-limiting examples of such flow-control agents include polyethers, silicones, or fluorosurfactants.

The anti-fog coating compositions described herein are applied in any suitable manner to the substrate. The anti-fog coating compositions are applied directly to the substrate, indirectly to the substrate, such as being applied to a primer coated surface of the substrate. For example, the compositions of this invention are applied to solid substrates by conventional methods, such as flow coating, spray coating, curtain coating, dip coating, spin coating, roll coating, and the like to form a continuous surface film on the substrate.

The coating compositions described herein are applied to a variety of substrates, including but not limited to plastics or glass used in various applications, such as plastic or glass used in optical lenses; goggles; face shields; face plates for helmets; automobile windshields; automobile headlamp covers; automobile instrumentation gauges and gauge covers; greenhouse walls and ceilings; plastic or glass used between temperature differentials, e.g., frozen food display doors; and the like. Suitable substrates include primer coated substrates and non-primer coated substrates. Examples of preferred substrates include transparent plastics such as polycarbonate, acrylic, polyvinylchloride, polybisallyl carbonate, polyethylene terephthalate, polyurethane, polythiourethane, and polyethylene naphthenate. Other suitable substrates include various polyolefins, fluorinated polymers, metals, and glass, such as soda-lime glass, borosilicate glass, acrylic glass among other types of glass. The substrate optionally has a primer, an adhesive, or tack applied to any uncoated surface.

In accordance with another embodiment, articles are provided. The articles comprise a transparent substrate coated with a stable coating composition which, when applied to the substrate and cured, provides a transparent, abrasion-resistant, chemical-resistant, low-tack, and water-washable anti-fog coating. The coating composition includes an organosiloxane coating composition in accordance with the coating compositions described herein. In addition, the article further comprises a primer layer disposed between the substrate and the coating composition.

In accordance with another embodiment, a process for preparing the stable anti-fog coating compositions described herein is provided. A process for preparing a coating composition which provides a transparent, abrasion-resistant, chemical-resistant, low-tack, and water-washable anti-fog coating when cured, comprises reacting an epoxy functional alkoxysilane, a tetrafunctional alkoxysilane, an alkoxysilyl functional polymer having polyethylene oxide segments, an alkoxysilyl functional cationic surfactant, and a carboxylic acid functional compound in an aqueous-organic solvent to form a mixture comprising hydrolysis products and partial condensates. The process includes mixing a non-reactive anionic surfactant with the resulting mixture comprising hydrolysis products and partial condensates to form the coating composition. In addition, the process further comprises mixing a blocked isocyanate with the coating composition. Moreover, the step of reacting in accordance with this process further includes the presence of a compound selected from the group consisting of an alkoxysilyl functional salt of an anionic surfactant, a methyltrialkoxysilane, a bis-trialkoxysilyl functional ethane, a colloidal silica, and combinations thereof.

In accordance with this embodiment, the process may further comprise preparing the alkoxysilyl functional polymer having polyethylene oxide segments by reacting a polyol polymer having polyethylene oxide segments with an isocyanato-alkyl functional alkoxysilane, wherein the isocyanto-alkyl functional groups of the isocyanato-alkyl functional alkoxysilane and hydroxyl functional groups of the polyol polymer are present in a molar ratio of isocyanto-alkyl functional groups to hydroxyl functional groups ranging from about 1:3 to about 1:1. The process for preparing the anti-fog coating composition in accordance with this embodiment may also further comprise preparing the alkoxysilyl functional cationic surfactant by reacting an isocyanato-alkyl functional alkoxysilane and a quaternary ammonium surfactant having two hydrophilic isocyanate-reactive functional groups and a hydrophobic hydrocarbon chain having at least about 18 carbon atoms, wherein the two hydrophilic isocyanate-reactive functional groups comprise hydroxyethyl functional groups and the hydrophobic hydrocarbon chain comprises a stearamide or a stearamidopropyl functional group.

In accordance with another embodiment, a process for coating a transparent substrate is provided. A process for coating a transparent substrate with a stable coating composition, which provides a transparent, abrasion-resistant, chemical-resistant, low-tack, and water-washable anti-fog coating when cured, comprises applying an organosiloxane coating composition in accordance with the coating compositions described herein to at least one surface of a transparent substrate and curing the coating composition on the at least one surface of the substrate. The coating composition is applied by flow coating, spray coating, curtain coating, dip coating, spin coating, or roll coating. The step of curing occurs at a temperature ranging from about 80° C. to about 200° C. for a period of time ranging from about 15 minutes to about 8 hours, preferably at a temperature ranging from about 100° C. to about 150° C. for a period of time ranging from about 30 minutes to about 4 hours. The process further includes applying the coating composition directly to the at least one surface of the substrate. Alternatively, the process further includes applying a primer to the at least one surface of the substrate and air-drying or at least partially curing the primer prior to applying the coating composition to the primer.

The following analytical test methods and examples are for purposes of illustration only and are not intended to limit the scope of the invention as defined in the claims which are appended hereto.

ANALYTICAL TEST METHODS

Parameters and values used to quantify certain elements of the present invention, including but not limited to, the examples presented herein are described in detail as follows:

Substrate Used:

Unless otherwise indicated in the Examples below, flat polycarbonate or polycarbonate lenses primed with a commercially available primer coating, CP-620 polyurethane primer coating (available from SDC Technologies, Inc. of Irvine, Calif.), are used.

Application of the Coating Composition to a Substrate:

For each Example described herein, multiple primed polycarbonate substrates are flow-coated with the coating composition or dip-coated in the coating composition (dip-coated at a speed of 10 inches per minute draw rate). Unless otherwise specified, the coating compositions used are not aged prior to being applied to the substrates for each Example. Each flow or dip-coated substrate is dried for 30 minutes and then treated with heat to cure at a specific temperature for a specified amount of time resulting in a coated polycarbonate substrate. Different coated substrates are used for the different types of tests within each Example, i.e., one coated substrate is used for the adhesion test and another coated substrate is used for the room temperature water soak anti-fog test.

Coating Thickness Measurement:

The measurement of the coating thickness of the coated polycarbonate substrate is made using an F-20 Film Measurement Unit with a contact stage, available from Filmetrics, Inc. of San Diego, Calif. The coating thickness reported in the Examples is an average value of the coating thickness for the multiple substrates per Example.

Adhesion Test:

The coated substrate is soaked in boiling water for one hour. After cooling and drying, a cross-hatched pattern is made on the coating of the substrate with a razor blade. Tape is then applied to the cross-hatched section of the coated substrate. After the tape is applied, the tape is removed from the coating. The application and removal of the tape is repeated three times. If any of the coating is removed from the substrate due to the repeated application and removal of the tape, then the coating composition fails the test. If none of the coating is removed from the substrate during the repeated application and removal of the tape, then them coating composition passes the test. The tape used in accordance with the adhesion test is Scotch 8 brand tape, Scotch 600 from 3M Company of St. Paul, Minn.

Beaker Test:

The coated substrate is positioned at a standard height above a beaker containing 50° C. water, and the coated substrate in this position is exposed to water vapors from the 50° C. water for up to three minutes. Generally, for the coatings formed from the coating compositions of this invention, it takes less than three minutes after first exposing the coated substrate to the water vapor for a continuous film of water to form over the entire coated substrate from the exposure to the water vapor during this test. After this continuous film of water forms over the coating, the coating will not fog-up because the water will sheet out across the film of water, thereby not allowing the tiny water droplets that give the appearance of fog to form. If fog appears on the coated substrate during this test, the time it takes for fog to appear on the coated substrate after being exposed to the water vapor of this test is recorded.

Initial Anti-Fog Test:

Without the coated substrate being treated or modified in any other manner, the coated substrate is subjected to the beaker test for three minutes. If the coated substrate stays clear, i.e., if no fog or haze appears on the coated substrate in this period of time, the coating composition passes the initial anti-fogging test. Otherwise, if fog or haze appears on the coated substrate, then the coating composition fails the initial anti-fogging test.

Breathe Test:

The coated substrate is positioned about one to three inches from the tester's mouth. The tester breathes on the coated substrate in a manner so as to intentionally fog the substrate. If no fog or haze appears on the coated substrate during this test, the coating composition passes the breathe test. Otherwise, if fog or haze appears on the coated substrate, then the coating composition fails this test.

Room Temperature Water Soak Anti-Fog Test:

A coated substrate is soaked in water at room temperature for one hour. After allowing the coated substrate to recover and dry from the soaking for 12 hours, the coated substrate is subjected to the beaker test.

Boiling Water Soak Anti-Fog Test:

A coated substrate is soaked in boiling water for one hour. After cooling and drying, the coated substrate is subjected to the beaker test.

Initial Haze Test:

The percent haze of the coated substrate is measured using a Haze-Gard Plus available from BYK Gardner USA of Columbia, Md. The measurement of the haze using the Haze-Gard Plus is a quantification of the amount of light scattered as a result of the transmission of the light through the coated substrate. The initial haze percent is measured shortly after curing the coating on the substrate and before the coated substrate is modified or treated in any other way. Haze greater than or equal to about 1.0% is visible on the surface of the coated substrate substrate. Conversely, haze less than or equal to about 1.0% is not visible on the coated substrate.

Haze Test after Falling Sand:

The coated substrate is set on an HP-1160 Gardner Falling Sand Apparatus, available from Paul N. Gardner Company of Pompano Beach, Fla. Three kilograms of ASTM 20-30 sand falls through the HP-1160 Apparatus onto the coated substrate. After washing the coated substrate with soap and water to remove residual sand and drying, the haze percent is measured on the coated polycarbonate substrate. The mathematical difference between the initial percent haze and any subsequent percent haze reading is called the haze gain.

Chemical Wipe Test:

The coated substrate is separately wiped with each of a cloth soaked with methyl ethyl ketone and a cloth soaked with isopropyl alcohol. Coatings that are not attacked, e.g., soften, crack, haze, or lose adhesion, by the chemical wiping pass the test, while coatings that are attacked by the chemical wipe fail the test.

Chemical Drop Test:

Separate drops of methyl ethyl ketone and toluene are contacted with the surface of the coating for a period of 30 seconds. The coating passes the drop test if the chemical does not attack the coating during this period of time.

Steel Wool Test:

The coated substrate is scratched under reproducible conditions with steel wool. In this test, the coated substrate is contacted with a steel wool (grade #0000), on which a 100 g weight is loaded for 10 cycles. The test machine, Model YT-520, is available from Yin Tsung Co., Ltd. of Taiwan. Following the test, one to two scratches on the coated substrate are considered excellent results; three to five scratches are considered good results; and more than five scratches are considered poor results.

Tackiness Test:

The coated substrate is wiped with a cotton tissue. The coatings with a smooth or low-tack surface accumulated less tissue residue than coatings with less smooth or higher tack surface. Accordingly, following the wipe with the tissue, coating is considered tacky if the tissue leaves behind significant or substantial tissue residue on the coating. A coating is considered "smooth" if substantially no tissue residue is left behind on the coated substrate following wiping.

LIST OF MATERIALS/ABBREVIATIONS USED IN EXAMPLES

AF-1140: An anti-fog organosiloxane coating composition which includes a non-reactive anionic surfactant additive, commercially available from SDC Technologies, Inc.

BL3175A: A blocked polyisocyanate solution (75% solids in aromatic 100) based on a hexamethylene diisocyanate, commercially available as Desmodur® BL 3175A from Bayer MaterialScience LLC, of Pittsburgh, Pa.

Cirrasol G-265: A quaternary ammonium surfactant having two hydroxyethyl functional groups and a hydrophobic chain containing stearamide functionality, commercially available from Uniquema Co. of Chicago, Ill.

CP-620: A polyurethane primer composition, commercially available from SDC Technologies, Inc.

DMAMP DBS solution: A 2-dimethylamine-2-methylpropan-1-ol salt of dodecylbenzene sulfonic acid solution (50% in xylene).

FC-171: A flouorochemical surfactant flow control agent, commercially available as FC-171 FLUORAD Brand Fluorochemical Surfactant from 3M Corporation of St. Paul, Minn.

GPTMS: An 3-glycidoxypropyltrimethoxysilane epoxy functional silane.

N1034A: A colloidal silica, commercially available from Nalco Chemical Co. of Naperville, Ill.

OT-75: A non-reactive anionic surfactant salt solution of sodium dioctyl sulfosuccinate (75% in water and alcohol), commercially available from Cytec Industries, Inc. of Woodland Park, N.J.

PGME: Propylene glycol methyl ether.

PEO/PPO Triol: A polyethylene oxide and polypropylene oxide copolymer triol with an average $M_w$ of about 5000. This copolymer triol comprises 80% (wt) polyethylene oxide and 20% (wt) polypropylene oxide. A commercially available example of the PEO/PPO Triol is Poly-G® 83-34, from Arch Chemicals, Inc. of Norwalk, Conn.

SIH6188: A [hydroxy(polyethyleneoxy)propyl]triethoxysilane solution (50% in ethanol), commercially available from Gelest, Inc. of Morrisville, Pa.

PREPARATION OF ALKOXYSILYL FUNCTIONAL MATERIALS USED IN EXAMPLES

PREMIX-1—Preparation of a Fully Silylated Alkoxysilyl Functional Polymer Having Polyethylene Oxide Segments 104 g of 3-isocyanatopropyl triethoxysilane is mixed with 80.0 g of polyethylene glycol ($M_w$ 400). 0.01 g of dibutyltindilaurate is added to the mix. Under nitrogen purging, the mixture is heated up to 70° C. and is mixed for 4 hours. After the reaction finishes, the mixture is cooled down. About 184 g of PREMIX-1 is prepared.

PREMIX-2—Preparation of a Partially Silylated Alkoxysilyl Functional Polymer Having Polyethylene Oxide Segments 35 g of 3-isocyanatopropyl triethoxysilane is mixed with 330 g of PEO/PPO Triol. 0.02 g of dibutyltindilaurate is added to the mix. Under nitrogen purging, the mixture is heated up to 70° C. and is mixed for 4 hours. After the reaction finishes, the mixture is cooled down. About 395 g of PREMIX-2 is prepared.

PREMIX-3—Preparation of an Alkoxysilyl Functional Cationic Surfactant 104 g of 3-isocyanatopropyl triethoxysilane is mixed with 206 g of Cirrasol G-265. 0.02 g of dibutyltindilaurate is added to mix. Under nitrogen purging, the mixture is heated up to 70° C. and is mixed for 4 hours. After the reaction finishes, the mixture is cooled down. About 310 g of PREMIX-3 is prepared.

PREMIX-4—Preparation of an Alkoxysilyl Functional Salt of an Anionic Surfactant 36 g of 3-isocyanatopropyl triethoxysilane is mixed with 124 g of DMAMP DBS solution. 0.01 g of dibutyltindilaurate is added to mix. Under nitrogen purging, the mixture is heated up to 70° C. and is mixed for 4 hours. After the reaction finishes, the mixture is cooled down. About 160 g of PREMIX-4 is prepared.

EXAMPLES

Example 1—Preparation and Testing Of Anti-Fog Coating Compositions with Fully Silylated Alkoxysilyl Functional Polymer Having Polyethylene Oxide Segments

Example 1A 0.2 g of itaconic acid is added into 26.9 g of water. After the itaconic acid dissolves, 15.3 g of GPTMS is slowly added into the mixture. After 30 minutes of mixing, 23.2 g of PGME and 1.9 g of itaconic acid are added to the mixture. After the additional itaconic acid dissolves, 16.5 g of PREMIX-1 and 1.0 g of PREMIX-3 and 32.4 g of tetraethyl orthosilicate are slowly added into the mixture. After stirring overnight, 3.0 g of OT-75 and 0.5 g of 10% (wt) solution of FC-171 in PGME are added into the mixture. The resulting mixture is an organosiloxane polymer coating composition having 30% solids by weight. The resulting coating composition comprises about 19.9% by weight solids polyethylene oxide, about 1.8% by weight solids alkoxysilyl functional cationic surfactant, and about 6.2% by weight solids non-reactive anionic surfactant.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 11.2 µm. The initial haze according to the initial haze test on the coated substrate results in a haze of about 0.2%. The haze test after falling sand results in a haze of about 4.1%, which gives a haze gain of about 3.9%. This coated substrate passes the initial anti-fog test and the breathe test. This coated substrate fogs-up at about 6 seconds during the room temperature water soak anti-fog test and at about 5 seconds during the boiling water soak test. This coating also passes the chemical wipe test.

Example 1B 0.2 g of itaconic acid is added into 26.9 g of water. After the itaconic acid dissolves, 15.3 g of GPTMS is slowly added into the mixture. After 30 minutes of mixing, 23.2 g of PGME and 1.9 g of itaconic acid are added to the mixture. After the additional itaconic acid dissolves, 16.5 g of PREMIX-1, 5.0 g of PREMIX-3, and 32.4 g of tetraethyl orthosilicate are slowly added into the mixture. After stirring overnight, 3.0 g of OT-75 and 0.5 g of 10% (wt) solution of FC-171 in PGME are added into the mixture. The resulting mixture is an organosiloxane polymer coating composition having 32% solids by weight. The resulting coating composition comprises about 18.2% by weight solids polyethylene oxide, about 8.4% by weight solids alkoxysilyl functional cationic surfactant, and about 5.7% by weight solids non-reactive anionic surfactant.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 13.3 µm. The initial haze according to the initial haze test on the coated substrate results in a haze of about 0.1%. The haze test after falling sand results in a haze percent of about 4.1%, which gives a haze gain of about 4.0%. This coated substrate passes the initial anti-fog test and the breathe test. This coated substrate fogs-up at about 8 seconds during the room temperature water soak anti-fog test and at about 10 seconds during the boiling water soak test. This coating also passes the chemical wipe test.

Example 1C 0.2 g of itaconic acid is added into 26.9 g of water. After the itaconic acid dissolves, 15.3 g of GPTMS is slowly added into the mixture. After 30 minutes of mixing, 23.2 g of PGME and 1.9 g of itaconic acid are added to the mixture. After the additional itaconic acid dissolves, 16.5 g of PREMIX-1, 10.0 g of PREMIX-3, and 32.4 g of tetraethyl orthosilicate are slowly added into the mixture. After stirring overnight, 3.0 g of OT-75 and 0.5 g of 10% (wt) solution of FC-171 in PGME are added into the mixture. The resulting mixture is an organosiloxane polymer coating composition having 34% solids by weight. The resulting coating composition comprises about 16.4% by weight solids polyethylene oxide, about 15.1% by weight solids alkoxysilyl functional cationic surfactant, and about 2.3% by weight solids non-reactive anionic surfactant.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 17.0 µm. The initial haze according to the initial haze test on the coated substrate results in a haze of about 0.1%. The haze test after falling sand results in a haze of about 3.5%, which gives a haze gain of about 3.4%. This coated substrate passes the initial anti-fog test and the breathe test. This coated substrate fogs-up at about 10 seconds during the room temperature water soak anti-fog test and at about 20 seconds during the boiling water soak test. This coating also passes the chemical wipe test.

Example 2—Preparation and Testing of Comparative Example Coating Compositions

Example 2A 0.2 g of itaconic acid is added into 26.9 g of water. After the itaconic acid dissolves, 15.3 g of GPTMS is slowly added into the mixture. After 30 minutes of mixing, 23.2 g of PGME and 1.9 g of itaconic acid are added to the mixture. After the additional itaconic acid dissolves, 3.0 g of PRE-MIX-1 and 32.4 g of tetraethyl orthosilicate are slowly added into the mixture. After stirring overnight, 0.5 g of 10% (wt) solution of FC-171 in PGME is added into the mixture. The resulting mixture is an organosiloxane polymer coating composition having 24% solids by weight. The resulting coating composition comprises about 5.3% by weight solids polyethylene oxide.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 5.8 μm. The initial haze according to the initial haze test on the coated substrate results in a haze of about 0.2%. The haze test after falling sand results in a haze of about 2.3%, which gives a haze gain of about 2.1%. This coated substrate fogs-up immediately when exposed to the vapors of each test for the initial anti-fog test, the breathe test, the room temperature water soak anti-fog test, and boiling water soak test.

Example 2B 0.2 g of itaconic acid is added into 26.9 g of water. After the itaconic acid dissolves, 15.3 g of GPTMS is slowly added into the mixture. After 30 minutes of mixing, 23.2 g of PGME and 1.9 g of itaconic acid are added to the mixture. After the additional itaconic acid dissolves, 13.0 g of PRE-MIX-1 and 32.4 g of tetraethyl orthosilicate are slowly added into the mixture. After stirring overnight, 0.5 g of 10% (wt) solution of FC-171 in PGME is added into the mixture. The resulting mixture is an organosiloxane polymer coating composition having 28.8% solids by weight. The resulting coating composition comprises about 17.4% by weight solids polyethylene oxide.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 8.0 μm. The initial haze according to the initial haze test on the coated substrate results in a haze of about 0.2%. The haze test after falling sand results in a haze of about 2.5%, which gives a haze gain of about 2.3%. This coated substrate fails the initial anti-fog test by fogging-up when exposed to vapor for about 2 seconds, and this coated substrate also fails the breathe test. Moreover, this coated substrate fogs-up at about 2 seconds after being exposed to the vapor for each of the room temperature water soak anti-fog test and the boiling water soak test.

Example 2C 0.2 g of itaconic acid is added into 26.9 g of water. After the itaconic acid dissolves, 15.3 g of GPTMS is slowly added into the mixture. After 30 minutes of mixing, 23.2 g of PGME and 1.9 g of itaconic acid are added to the mixture. After the additional itaconic acid dissolves, 21.5 g of PRE-MIX-1 and 32.4 g of tetraethyl orthosilicate are slowly added into the mixture. After stirring overnight, 0.5 g of 10% (wt) solution of FC-171 in PGME is added into mixture. The resulting mixture is an organosiloxane polymer coating composition having 32.3% solids by weight. The resulting coating composition comprises about 11.1% by weight solids polyethylene oxide.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 11.1 μm. The initial haze according to the initial haze test on the coated substrate results in a haze of about 0.2%. The haze test after falling sand results in a haze of about 2.7%, which gives a haze gain of about 2.5%. This coated substrate fails the initial anti-fog test by fogging-up when exposed to vapor for about 5 seconds, and this coated substrate also fails the breathe test. Moreover, this coated substrate fogs-up at about 4 seconds after being exposed to the vapor for each of the room temperature water soak anti-fog test and the boiling water soak test.

Example 2D 0.2 g of itaconic acid is added into 26.9 g of water. After the itaconic acid dissolves, 15.3 g of GPTMS is slowly added into the mixture. After 30 minutes mixing, 23.2 g of PGME and 1.9 g of itaconic acid are added to the mixture. After the additional itaconic acid dissolves, 26.5 g of PRE-MIX-1 and 32.4 g of tetraethyl orthosilicate are slowly added into the mixture. After stirring overnight, 0.5 g of 10% (wt) solution of FC-171 in PGME is added into the mixture. The resulting mixture is an organosiloxane polymer having about 34.1% solids by weight. The resulting coating composition comprises about 26.8% by weight solids polyethylene oxide. This mixture does not uniformly apply to the substrate.

Example 2E 0.2 g of itaconic acid is added into 26.9 g of water. After the itaconic acid dissolves, 15.3 g of GPTMS is slowly added into the mixture. After 30 minutes of mixing, 23.2 g of PGME and 1.9 g of itaconic acid are added to the mixture. After the additional itaconic acid dissolves, 16.5 g of PRE-MIX-1 and 32.4 g of tetraethyl orthosilicate are slowly added into the mixture. After stirring overnight, 3.0 g of OT-75 and 0.5 g of 10% (wt) solution of FC-171 in PGME are added into the mixture. The resulting mixture is an organosiloxane polymer coating composition having 29.5% solids by weight. The resulting coating composition comprises about 20.4% by weight solids polyethylene oxide. This coating composition does not result in a clear coating. The initial haze of the coated substrate is 38.0%.

This coating composition is comparable to Examples 1A-1C, except that this coating composition does not include any of the alkoxysilyl functional cationic surfactant prepared in PREMIX-3.

Example 3—Preparation and Testing of an Anti-Fog Coating Composition with Partially Silylated Alkoxysilyl Functional Polymer Having Polyethylene Oxide Segments 0.2 g of itaconic acid is added into 26.9 g of water. After the itaconic acid dissolves, 15.3 g of GPTMS is slowly added into the mixture. After 30 minutes of mixing, 23.2 g of PGME and 1.9 g of itaconic acid are added to the mixture. After the additional itaconic acid dissolves, 7.4 g of PRE-MIX-2, 5.0 g of PREMIX-3, and 32.4 g of tetraethyl orthosilicate are slowly added into the mixture. After stirring overnight, 3.0 g of OT-75 and 0.5 g of 10% (wt) solution of FC-171 in PGME are added into the mixture. The resulting mixture is an organosiloxane polymer coating composition having 29.3% solids by weight. The resulting coating composition comprises about 19.8% by weight solids polyethylene oxide and polypropylene oxide, about 9.8% by weight solids alkoxysilyl functional cationic surfactant, and about 6.7% by weight solids non-reactive anionic surfactant.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 10.4 μm. The initial haze according to the initial haze test on the coated substrate results in a haze of about 0.2%. The haze test after falling sand results in a haze percent of about 8.7%, which gives a haze gain of about 8.5%. This coated substrate passes the initial anti-fog test and the breathe test. This coated substrate fogs-up at about 10 seconds during the room temperature water soak anti-fog test and remains clear throughout the duration of the boiling water soak test, which lasts for at least 180 seconds. This coating also passes the chemical wipe test.

Example 4—Preparation and Testing of an Anti-Fog Coating Composition with a Partially Silylated Alkoxysilyl Functional Polymer Having Polyethylene Oxide Segments and with an Alkoxysilyl Functional Salt of an Anionic Surfactant 11.5 g of water is added into 15.5 g of N1034A and is mixed. 13.0 g of GPTMS and 12.5 g of methyltrimethoxysilane is slowly added into the mixture. 3.1 g of itaconic acid is then added to the mixture. After the itaconic acid dissolves, 6.0 g of PREMIX-2, 4.0 g of PREMIX-3, and 2.0 g of PREMIX-4 are slowly added into the mixture. After stirring overnight, 15.6 g of PGME, 12.0 g of n-butanol, 0.7 g of benzyldimethylamine, 3.2 g of OT-75, and 1.0 g of 10% (wt) solution of FC-171 in PGME are added into the mixture. The resulting mixture is an organosiloxane polymer coating composition having 37% solids by weight. The resulting coating composition comprises about 14.7% by weight solids polyethylene oxide and polypropylene oxide, about 7.2% by weight solids alkoxysilyl functional cationic surfactant, and about 4.9% by weight solids non-reactive anionic surfactant.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 9.4 μm. The initial haze according to the initial haze test on the coated substrate results in a haze of about 0.4%. The haze test after falling sand results in a haze percent of about 10.5%, which gives a haze gain of about 10.1%. The steel wool test results in 3 to 5 scratches to this coated substrate. This coated substrate passes the initial anti-fog test and the breathe test. This coated substrate remains clear throughout the duration of the room temperature water soak anti-fog test staying clear for at least 180 seconds and remains clear throughout the duration of the boiling water soak test staying clear for at least 180 seconds. This coating also passes the adhesion test and the chemical wipe test, and is considered smooth as a result of the tackiness test.

Example 5—Preparation and Testing of Comparative Example Coating Compositions

Example 5A 10.5 g of water is added into 18.5 g of N1034A and is mixed. 13.0 g of GPTMS and 12.5 g of methyltrimethoxysilane are slowly added into the mixture. 3.1 g of itaconic acid is added to the mixture. After the itaconic acid dissolves, 6.0 g of PREMIX-2 and 4.0 g of PREMIX-3 are slowly added into the mixture. After stirring overnight, 15.6 g of PGME, 12.0 g of n-butanol, 0.7 g of benzyldimethylamine, 3.2 g of OT-75, and 1.0 g of 10% (wt) solution of FC-171 in PGME are added into the mixture. The resulting mixture is an organosiloxane polymer coating composition having 37% solids by weight. The resulting coating composition comprises about 14.7% by weight solids polyethylene oxide and polypropylene oxide, about 7.2% by weight solids alkoxysilyl functional cationic surfactant, and about 7.0% by weight solids non-reactive anionic surfactant.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 9.6 μm. The initial haze according to the initial haze test on the coated substrate results in a haze of about 0.5%. The haze test after falling sand results in a haze of about 9.5%, which gives a haze gain of about 9.0%. The steel wool test results in 1 scratch to this coated substrate. This coated substrate passes the initial anti-fog test and the breathe test. This coated substrate remains clear throughout the duration of the room temperature water soak anti-fog test by staying clear for at least 180 seconds and fogs-up at about 8 seconds during the boiling water soak test. This coating also passes the adhesion test and the chemical wipe test and is considered smooth as a result of the tackiness test.

The compositions of Example 4 and Example 5A are comparable except that the composition of Example 4 includes alkoxysilyl functional salt of an anionic surfactant, and the composition of Example 5A does not include this surfactant. The addition of the alkoxysilyl functional salt of an anionic surfactant in Example 4 improves the anti-fog properties of the coating cured over the coating cured from the composition of Example 5A, particularly with respect to the boiling water soak test.

Example 5B 11.5 g of water is added into 25.5 g of N1034A and is mixed. 13.0 g of GPTMS and 12.5 g of methyltrimethoxysilane are slowly added into the mixture. 3.1 g of itaconic acid is added to the mixture. After the itaconic acid dissolves, 6.0 g of PREMIX-2 and 2.0 g of PREMIX-4 are slowly added into the mixture. After stirring overnight, 15.6 g of PGME, 12.0 g of n-butanol, 0.7 g of benzyldimethylamine, 3.2 g of OT-75, and 1.0 g of 10% (wt) solution of FC-171 in PGME are added into the mixture. The resulting mixture is an organosiloxane polymer coating composition having 37% solids by weight. The resulting coating composition comprises about 14.7% by weight solids polyethylene oxide and polypropylene oxide and about 7.0% by weight solids non-reactive anionic surfactant.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 11.0 μm. The initial haze according to the initial haze test on the coated substrate results in a haze of about 8.9%. This coated substrate passes the chemical wipe test and is considered smooth according to the tackiness test. The coating on this substrate fails the adhesion test because the coating delaminates from the substrate during the test.

Example 5B does not include the alkoxysilyl functional cationic surfactant prepared in PREMIX-3. As can be seen from the comparable coating compositions of Examples 4 and 5A, without allowing the coating compositions to age, the omission of this surfactant from the coating composition of Example 5B results in a hazy coating.

Example 5C 11.5 g of water is added into 25.5 g of N1034A and is mixed. 13.0 g of GPTMS and 12.5 g of methyltrimethoxysilane are slowly added into the mixture. 3.1 g of itaconic acid is added to the mixture. After the itaconic acid dissolves, 4.0 g of PREMIX-3 and 2.0 g of PREMIX-4 are slowly added into the mixture. After stinting overnight, 15.6 g of PGME, 12.0 g of n-butanol, 0.7 g of benzyldimethylamine, 3.2 g of OT-75, and 1.0 g of 10% (wt) solution of FC-171 in PGME are added into the mixture. The resulting mixture is an organosiloxane polymer coating composition having 37% solids by weight. The resulting coating composition comprises about 7.2% by weight solids alkoxysilyl functional cationic surfactant and about 7.0% by weight solids non-reactive anionic surfactant.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 6.3 μm. The initial haze according to the initial haze test on the coated substrate results in a haze of about 1.5%. The haze test after falling sand results in a haze of about 8.7%, which gives a haze gain of about 7.2%. The steel wool test results in 1 scratch to this coated substrate. This coated substrate fogs-up immediately when exposed to the vapors for each of the initial anti-fog test, the breathe test, the room temperature water soak anti-fog test, and boiling water soak test. This coating passes the chemical wipe test and the adhesion test and is considered smooth by the tackiness test.

Example 6—Preparation and Testing of a Primed Polycarbonate Substrate with the Coating Composition of Example 4

A CP-620 primer is flow coated on a flat polycarbonate substrate. After 30 minutes drying at room temperature, the coating composition of Example 4 is flow coated on the primer coating. After allowing the coating composition to dry for 30 minutes at room temperature, the coated substrate is treated with heat to cure at 129° C. for 2 hours resulting in an organosiloxane coated polycarbonate substrate having a coating thickness of about 12.8 μm. The initial haze according to the initial haze test on the coated substrate results in a haze of about 0.3%. The haze test after falling sand results in a haze of about 9.6%, which gives a haze gain of about 9.3%. This coated substrate passes the initial anti-fog test and the breathe test. This coated substrate remains clear throughout the duration of the room temperature water soak anti-fog test staying clear for at least 180 seconds and remains clear throughout the duration of the boiling water soak test staying clear for at least 180 seconds. This coating also passes the adhesion test and is considered smooth by the tackiness test. This coating passes the chemical wipe test using separate isopropyl alcohol and methyl ethyl ketone wipes and also passes the chemical drop test using each of methyl ethyl ketone and toluene. The coating composition used in this Example has an initial viscosity of about 22 cps following preparation and a viscosity of about 36 cps at about two months following preparation.

Example 7—Preparation and Testing of a Primed Polycarbonate Substrate with a Comparative Example Commercially Available Organosiloxane Coating Composition Having a Non-Reactive Surfactant Anionic Surfactant Additive An AF-1140 organosiloxane coating composition with the non-reactive anionic surfactant additive is aged for at least 3 weeks. The AF-1140 coating composition comprises about 7.7% by weight solids non-reactive anionic surfactant.

A CP-620 primer is flow coated on a flat polycarbonate substrate. After 30 minutes dry at room temperature, the AF-1140 coating composition is flow coated on the primer coating. After allowing the AF-1140 coating composition to dry for 30 minutes at room temperature, the coated substrate is treated with heat to cure at 129° C. for 2 hours resulting in an organosiloxane coated polycarbonate substrate having a coating thickness of about 5.2 μm. The initial haze according to the initial haze test on the coated substrate results in a haze of about 0.2%. The haze test after falling sand results in a haze of about 7.9%, which gives a haze gain of about 7.7%. This coated substrate passes the initial anti-fog test and the breathe test. This coated substrate fogs-up in 2-3 seconds during each of the room temperature water soak anti-fog test and boiling water soak test. This coating also passes the adhesion test and is considered smooth by the tackiness test. This coating passes the chemical wipe test using separate isopropyl alcohol and methyl ethyl ketone wipes and also passes the chemical drop test using each of methyl ethyl ketone and toluene. The coating composition used in this Example has an initial viscosity of about 9 cps following preparation and a viscosity of about 15 cps at about two months following preparation.

Example 8—Preparation and Testing of a Primed Polycarbonate Substrate with a Comparative Example Commercially Available Reactive Two Component Anti-Fog Polyurethane Coating Composition A flat polycarbonate substrate is flow-coated with a commercially available reactive two component anti-fog polyurethane coating composition, Visgard® Dual Coating 106-94, from FSI Coating Technologies, Inc. of Hillsborough, N.J. This two component polyurethane coating composition is prepared by mixing 100 g of a polyol solution (Part A) with 40 g of isocyanate solution (Part B). Then, 18 g of tertiary-butyl alcohol and 27 g of diacetone alcohol are added to the mixture. The resulting mixture is a polyurethane polymer coating composition initially having 30% solids by weight and a viscosity of about 12 cps. The viscosity of this coating composition is about 20 cps at about 24 hours following preparation and about 75 cps at about 72 hours following preparation. This composition gels after about 72 hours.

After 6 minutes drying at room temperature, the flow-coated substrate is treated with heat to cure at 120° C. for 2 hours resulting in a polyurethane coated polycarbonate substrate having a coating thickness of about 12.8 µm. The initial haze according to the initial haze test on the coated substrate results in a haze of about 0.5%. The haze test after falling sand results in a haze of about 2.3%, which gives a haze gain of about 1.8%. This coated substrate passes the initial anti-fog test and the breathe test. This coated substrate remains clear throughout the duration of the room temperature water soak anti-fog test staying clear for at least 180 seconds and remains clear throughout the duration of the boiling water soak test staying clear for at least 180 seconds. This coating also passes the adhesion test and is considered tacky by the tackiness test. This coating passes the chemical wipe test using separate isopropyl alcohol and methyl ethyl ketone wipes but fails the chemical drop test using each of methyl ethyl ketone and toluene.

Example 9—Preparation and Testing of an Anti-Fog Coating Composition with Partially Silylated Alkoxysilyl Functional Polymer Having Polyethylene Oxide Segments 11.5 g of water is added into 15.5 g of N1034A and is mixed. 13.0 g of GPTMS and 16.30 g of 1,2-bis(triethoxysilyl)ethane are slowly added into the mixture. 3.1 g of itaconic acid is then added to the mixture. After the itaconic acid dissolves, 18.0 g of SIH6188, and 6.0 g of PREMIX-3 are slowly added into the mixture. After stirring overnight, 12.6 g of PGME, 12.0 g of n-butanol, 0.7 g of benzyldimethylamine, 3.2 g of OT-75, and 1.0 g of 10% (wt) solution of FC-171 in PGME are added into the mixture. The resulting mixture is an organosiloxane polymer coating composition having 39% solids by weight. The resulting coating composition comprises about 16.8% by weight solids polyethylene oxide and polypropylene oxide and about 10.3% by weight solids alkoxysilyl functional cationic surfactant.

A primed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 12.5 µm. The initial haze according to the initial haze test on the coated substrate results in a haze of about 0.2%. The haze test after falling sand results in a haze percent of about 9.0%, which gives a haze gain of about 8.8%. The steel wool test results in 3 to 5 scratches to this coated substrate. This coated substrate passes the initial anti-fog test and the breathe test. This coated substrate remains clear throughout the duration of the room temperature water soak anti-fog test staying clear for 10 seconds. The coating also passes the adhesion test. This coating passes the chemical wipe test using separate isopropyl alcohol and methyl ethyl ketone wipes and also passes the chemical drop test using each of methyl ethyl ketone and toluene.

Example 10—Preparation and Testing of an Anti-Fog Coating Composition with Partially Silylated Alkoxysilyl Functional Polymer Having Polyethylene Oxide Segments and with a Blocked Isocyanate on an Unprimed Polycarbonate Substrate 2 g of BL3175A and 2 g of Diacetone alcohol are added and mixed into 100 g of the organosiloxane polymer coating composition of Example 9. The resulting organosiloxane polymer coating composition has 38.9% solids by weight and comprises about 16.1% by weight solids polyethylene oxide and polypropylene oxide, about 13.0% by weight solids alkoxysilyl functional cationic surfactant, and about 3.7% by weight solids blocked isocyanate.

An unprimed polycarbonate substrate is dip-coated in the coating composition at a 10 inch/min draw speed. The dip-coated substrate is treated with heat to cure at 129° C. for 2 hours resulting in an organosiloxane coated polycarbonate substrate having a coating thickness of about 10.0 µm. The initial haze according to the initial haze test on the coated substrate results in a haze of about 0.2%. The haze test after falling sand results in a haze percent of about 8.0%, which gives a haze gain of about 7.8%. The steel wool test results in 7-10 scratches to this coated substrate. This coated substrate passes the initial anti-fog test and the breathe test. This coated substrate remains clear throughout the duration of the room temperature water soak anti-fog test staying clear for 8 seconds. The coating also passes the adhesion test. This coating passes the chemical wipe test using separate isopropyl alcohol and methyl ethyl ketone wipes and also passes the chemical drop test using each of methyl ethyl ketone and toluene.

Example 11—Preparation and Testing of an Unprimed Polycarbonate Substrate with the Coating Composition of Example 9

An unprimed polycarbonate substrate is dip-coated in the coating composition of Example 9 at a 10 inch/min draw speed. The dip-coated substrate is treated with heat to cure at 129° C. for 2 hours resulting in an organosiloxane coated polycarbonate substrate having a coating thickness of about 11.0 µm. The coating fails the adhesion test because it easily delaminates at the cross-hatching during testing.

The coating compositions of Examples 9 and 10 are comparable, except that the coating composition of Example 9 does not include the blocked isocyanate additive and the composition of Example 10 does. As shown in this Example, the addition of the blocked isocyanate results in improved adhesion to an unprimed substrate.

It will be understood that various changes may be made without departing from the scope of the invention, which is not to be considered limited to what is described in the description.

What is claimed is:
1. A thermally curable coating composition which provides a transparent, abrasion-resistant, chemical-resistant, and water-washable anti-fog coating when cured, comprising:
 an aqueous-organic solvent mixture comprising:
  a non-reactive anionic surfactant;
  a carboxylic acid functional compound; and
  a mixture of hydrolysis products and partial condensates of:
   an epoxy functional alkoxysilane, at least one of a tetrafunctional alkoxysilane, a methyltrialkoxysilane, and combinations thereof,
an alkoxysilyl functional polymer having polyethylene oxide segments, and
an alkoxysilyl functional cationic surfactant comprising reaction products of an isocyanato-alkyl functional alkoxysilane and a quaternary ammonium surfactant having two hydrophilic isocyanate-reactive functional groups and a hydrophobic hydrocarbon chain having at least about 18 carbon atoms, wherein the two hydrophilic isocyanate-reactive functional groups comprise hydroxyethyl functional groups and the hydrophobic hydrocarbon chain comprises a stearamide or a stearamidopropyl functional group.

2. The composition of claim 1, wherein the carboxylic acid functional compound comprises a multifunctional carboxylic acid.

3. The composition of claim 1, wherein the non-reactive anionic surfactant comprises sodium dioctyl sulfosuccinate.

4. The composition of claim 1, wherein the alkoxysilyl functional polymer having polyethylene oxide segments comprises a polymer selected from the group consisting of (a) [hydroxy(polyethyleneoxy)propyl]trialkoxysilanes, (b) bis(3-trialkoxysilylpropyl)polyethylene oxides, and (c) reaction products of an isocyanato-alkyl functional alkoxysilane and a polyol polymer having polyethylene oxide segments.

5. The composition of claim 4,
wherein the polyol polymer is selected from the group consisting of a diol polymer having polyethylene oxide segments, a triol polymer having polyethylene oxide segments, and combinations thereof, and
wherein the reaction products are formed in the presence of a molar ratio of isocyanto-alkyl functional groups of the isocyanato-alkyl functional alkoxysilane to hydroxyl functional groups of the polyol polymer ranging from about 1:3 to about 1:1.

6. The composition of claim 1, wherein the non-reactive anionic surfactant comprises an amount ranging from greater than 0 to about 20% by weight solids, and wherein the alkoxysilyl functional cationic surfactant comprises an amount ranging from greater than 0 to about 50% by weight solids.

7. The composition of claim 1, wherein the aqueous-organic solvent mixture further comprises at least one of a colloidal silica or hydrolysis products and partial condensates of a compound selected from the group consisting of an alkoxysilyl functional salt of an anionic surfactant, a bis-trialkoxysilyl functional ethane, and combinations thereof.

8. The composition of claim 7, wherein the alkoxysilyl functional salt of an anionic surfactant comprises reaction products of an isocyanato-alkyl functional alkoxysilane and an isocyanate-reactive functional salt of an anionic surfactant.

9. The composition of claim 1, wherein the coating composition further comprises a blocked isocyanate.

10. An article comprising a transparent substrate coated with a coating composition which, when applied to the substrate and cured, provides a transparent, abrasion-resistant, chemical-resistant, and water-washable anti-fog coating, the coating composition comprising:
an aqueous-organic solvent mixture comprising:
a non-reactive anionic surfactant;
a carboxylic acid functional compound; and
a mixture of hydrolysis products and partial condensates of:
an epoxy functional alkoxysilane,
at least one of a tetrafunctional alkoxysilane, a methyltrialkoxysilane, and combinations thereof,
an alkoxysilyl functional polymer having polyethylene oxide segments, and
an alkoxysilyl functional cationic surfactant comprising reaction products of an isocyanato-alkyl functional alkoxysilane and a quaternary ammonium surfactant having two hydrophilic isocyanate-reactive functional groups and a hydrophobic hydrocarbon chain having at least about 18 carbon atoms, wherein the two hydrophilic isocyanate-reactive functional groups comprise hydroxyethyl functional groups and the hydrophobic hydrocarbon chain comprises a stearamide or a stearamidopropyl functional group.

11. The article of claim 10, wherein the carboxylic acid functional compound comprises a multifunctional carboxylic acid.

12. The article of claim 10, wherein the non-reactive anionic surfactant comprises sodium dioctyl sulfosuccinate.

13. The article of claim 10, wherein the alkoxysilyl functional polymer having polyethylene oxide segments comprises a polymer selected from the group consisting of (a) [hydroxy(polyethyleneoxy)propyl]trialkoxysilanes, (b) bis(3-trialkoxysilylpropyl)polyethylene oxides, and (c) reaction products of an isocyanato-alkyl functional alkoxysilane and a polyol polymer having polyethylene oxide segments.

14. The article of claim 10, wherein the aqueous-organic solvent mixture further comprises at least one of a colloidal silica or hydrolysis products and partial condensates of a compound selected from the group consisting of an alkoxysilyl functional salt of an anionic surfactant, a bis-trialkoxysilyl functional ethane, and combinations thereof.

15. The article of claim 10, wherein the coating composition further comprises a blocked isocyanate.

16. The article of claim 10, wherein the article further comprises a primer layer disposed between the substrate and the coating composition.

17. A process for coating a transparent substrate with a stable coating composition, which provides a transparent, abrasion-resistant, chemical-resistant, and water-washable anti-fog coating when cured, comprising:
applying a coating composition to at least one surface of a transparent substrate, wherein the coating composition comprises an aqueous-organic solvent mixture comprising:
a non-reactive anionic surfactant,
a carboxylic acid functional compound, and
a mixture of hydrolysis products and partial condensates of:
an epoxy functional alkoxysilane,
at least one of a tetrafunctional alkoxysilane, a methyltrialkoxysilane, and combinations thereof,
an alkoxysilyl functional polymer having polyethylene oxide segments, and
an alkoxysilyl functional cationic surfactant comprising reaction products of an isocyanato-alkyl functional alkoxysilane and a quaternary ammonium surfactant having two hydrophilic isocyanate-reactive functional groups and a hydrophobic hydrocarbon chain having at least about 18 carbon atoms, wherein the two hydrophilic isocyanate-reactive functional groups comprise hydroxyethyl functional groups and the hydrophobic hydrocarbon chain comprises a stearamide or a stearamidopropvl functional group; and curing the coating composition on the at least one surface of the substrate.

18. The process of claim 17 further comprising applying a primer to the at least one surface of the substrate and air-drying or at least partially curing the primer prior to applying the coating composition to the primer.

* * * * *